(12) United States Patent
Axelsson et al.

(10) Patent No.: US 8,895,172 B2
(45) Date of Patent: Nov. 25, 2014

(54) APPARATUS AND METHOD FOR CONTROLLING THE TEMPERATURE OF A BATTERY IN A HYBRID ELECTRIC VEHICLE

(75) Inventors: Tobias Axelsson, Göteborg (SE); Guy Mouden, Saint Priest (FR); Johan Larsson, Stenungsund (SE); Jerker Lennevi, Lerum (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 13/500,906

(22) PCT Filed: Oct. 9, 2009

(86) PCT No.: PCT/SE2009/000442
§ 371 (c)(1),
(2), (4) Date: Jun. 25, 2012

(87) PCT Pub. No.: WO2011/043703
PCT Pub. Date: Apr. 14, 2011

(65) Prior Publication Data
US 2012/0301755 A1    Nov. 29, 2012

(51) Int. Cl.
*H01M 10/50*    (2006.01)
*H01M 10/663*   (2014.01)
(Continued)

(52) U.S. Cl.
CPC ............. *H01M 10/5095* (2013.01); *B60K 6/48* (2013.01); *B60L 1/02* (2013.01); *B60L 1/04*
(Continued)

(58) Field of Classification Search
None
See application file for complete search history.

(56) References Cited

U.S. PATENT DOCUMENTS

| 5,291,960 | A  | 3/1994 | Brandenburg et al. |
| 6,575,258 | B1 | 6/2003 | Clemmer |

(Continued)

FOREIGN PATENT DOCUMENTS

| JP | 10032021   | A2 | 2/1998  |
| JP | 2000274240 | A2 | 10/2000 |

(Continued)

OTHER PUBLICATIONS

Yuichi (JP, 2000-274240) (a raw machine translation) (Abstract, Detailed Description & Drawings) (Mar. 10, 2000).*

(Continued)

*Primary Examiner* — Milton I Cano
*Assistant Examiner* — Carmen Lyles-Irving
(74) *Attorney, Agent, or Firm* — WRB-IP LLP

(57) ABSTRACT

A method is provided for controlling the temperature of a traction battery in a hybrid vehicle, where the hybrid vehicle includes an internal combustion engine and an electric motor for traction power. The method includes providing a first temperature regulating circuit for the internal combustion engine, providing a second temperature regulating circuit for the traction battery, heating the traction battery by an electrical heater provided in the second temperature regulating circuit in series with a pump, a radiator and the traction battery, transferring power to the electrical heater via a DC/DC converter from the electrical motor, which electrical motor is driven by the internal combustion engine, while the battery is below a predetermined temperature interval.

9 Claims, 1 Drawing Sheet

(51) Int. Cl.
  *B60K 6/48*    (2007.10)
  *B60L 1/02*    (2006.01)
  *B60L 1/04*    (2006.01)
  *B60L 3/00*    (2006.01)
  *B60L 11/18*   (2006.01)
  *H01M 10/615*  (2014.01)
  *H01M 10/625*  (2014.01)
  *H01M 10/6568* (2014.01)
  *H01M 10/63*   (2014.01)
  *H01M 10/6571* (2014.01)

(52) U.S. Cl.
  CPC ....... (2013.01); *B60L 3/0046* (2013.01); *B60L 11/187* (2013.01); *B60L 11/1874* (2013.01); *B60L 11/1875* (2013.01); *H01M 10/5006* (2013.01); *H01M 10/5016* (2013.01); *H01M 10/5077* (2013.01); *B60L 2210/10* (2013.01); *B60L 2240/445* (2013.01); *B60W 2510/0676* (2013.01); *B60W 2510/246* (2013.01); *H01M 10/502* (2013.01); *H01M 10/5083* (2013.01); *Y02T 10/6221* (2013.01); *Y02T 10/7005* (2013.01); *Y02T 10/705* (2013.01); *Y02T 10/7216* (2013.01)
  USPC .......................................... 429/120; 180/65.1

(56)   References Cited

U.S. PATENT DOCUMENTS

| 7,147,071 | B2  |          | 12/2006 | Gering et al. |         |
|-----------|-----|----------|---------|---------------|---------|
| 8,191,618 | B2* |          | 6/2012  | Gering et al. | 165/202 |
| 2005/0167169 | A1 |       | 8/2005  | Gering et al. |         |
| 2007/0210769 | A1 |       | 9/2007  | Tsutsumi et al. |       |
| 2009/0095449 | A1* |      | 4/2009  | Bandai et al. | 165/104.33 |
| 2009/0152028 | A1* |      | 6/2009  | Samie et al.  | 180/65.265 |
| 2009/0249807 | A1 |       | 10/2009 | Nemesh et al. |         |

FOREIGN PATENT DOCUMENTS

| JP | 2007245995 | A2 | 9/2007 |
| JP | 2009118729 | A  | 5/2009 |

OTHER PUBLICATIONS

Yoshinobu et al. (JP, 10-032021) (a raw machine translation) (Abstract & Detailed Description) (Mar. 2, 1998).*
International Search Report for corresponding International application No. PCT/SE2009/000442.
International Preliminary Report on Patentability for corresponding International application No. PCT/SE2009/000442.
Japanese Official Action (Aug. 13, 2013) for corresponding Japanese Application JP 2012-533109.
Chinese Official Action (Jun. 14, 2014) for corresponding Chinese Application 200980161888.4.
Japanese Official Action (Apr. 24, 2014) (translation) far corresponding Japanese Application 2012-533109.
CN1010110215A (Aug. 1, 2007) English Abstract.
CN1599125A (Mar. 23, 2005) English Abstract.
Patent Abstracts of Japan JP05-256208 (May 10, 1993) Toyota Motor Corp.
Patent Abstracts of Japan JP2002-291106 (Apr. 10, 2002) Mitsubishi Motors Corp.
CN1010110215A (Aug. 1, 2007) machine translation from Espacenet.com.
CN1599125A (Mar. 23, 2005) machine translation from Espacenet.com.
JP05-256208 (May 10, 1993) Toyota Motor Corp. machine translation from Patent Abstracts of Japan.
JP2002-291106 (Apr. 10, 2002) Mitsubishi Motors Corp.—machine translation from Patent Abstracts of Japan.

* cited by examiner

APPARATUS AND METHOD FOR CONTROLLING THE TEMPERATURE OF A BATTERY IN A HYBRID ELECTRIC VEHICLE

BACKGROUND AND SUMMARY

The invention relates to a hybrid vehicle battery temperature control method and apparatus.

Hybrid electric vehicles comprise an internal combustion engine and an electric machine. The electric machine is supplied with traction power at least partly from a battery.

It is known that temperature has an influence over battery performance. As the battery is being charged, the temperature of the battery may increase due to a chemical reaction of the battery solution. The temperature increase during charging may accelerate corrosion and degradation of the positive electrode. Therefore, a too high temperature of the battery may lower its performance and shorten its lifetime. Similarly, a too low temperature of the battery may also decrease its performance and lifetime. A desired operating temperature for a lead acid battery is 25° C.-40° C. while a lithium ion battery may have a desired operating temperature range of 0° C.-40° C.

In view of the above it is desired to control the temperature of the battery in a hybrid vehicle in order to extend the lifetime of the battery.

In U.S. Pat. No. 7,147,071 it is disclosed a hybrid electrical vehicle with a battery temperature regulating device. The device comprises an internal combustion engine coolant circuit and a battery coolant circuit. Heat is transferred between the circuits via a heat exchanger.

A problem with the solution proposed in U.S. Pat. No. 7,147,071 is the high cost for the heat exchanger and that the coolant circuit for the engine must be redesigned.

It is desirable to provide a method for controlling the temperature of a traction battery in a hybrid vehicle which overcomes the above mentioned problems.

In a first example embodiment according to an aspect of the invention it is provided a method for controlling the temperature of a traction battery in a hybrid vehicle, where said hybrid vehicle comprises an internal combustion engine and an electric motor for traction power, comprising the steps of: providing a first temperature regulating circuit for the internal combustion engine, providing a second temperature regulating circuit for the traction battery, heating the traction battery by an electrical heater provided in said second temperature regulating circuit in series with a pump, a radiator and said traction battery, transferring power to said electrical heater via a DC/DC converter from the electrical motor, which electrical motor is driven by said internal combustion engine, while said battery is below a predetermined temperature interval.

An advantage with this example embodiment is that the power for heating the battery is provided from the internal combustion engine via a DC/DC converter and said electrical motor.

In another example embodiment according to the present invention said method further comprising the step of using said battery for traction power only when said battery has a temperature within said predetermined temperature interval.

An advantage with this example embodiment is that the lifetime of the battery may be extended.

In another example embodiment according to the present invention said method further comprising the steps of providing a bypass circuit for said radiator in said second temperature regulating circuit, regulating a flow of liquid coolant into the radiator or into the bypass circuit by a valve.

An advantage with this example embodiment is that the time for reaching a working temperature of the battery may be decreased.

In another example embodiment of the present invention said method further comprising the step of: controlling said electric motor by a voltage target value for feeding power to the heater when said battery is below said predetermined temperature interval.

An advantage with this embodiment is that the electrical components life time may be increased and its performance may be secured.

In another example embodiment according to the present invention said method further comprising the step of: isolating said second temperature regulating circuit from said first temperature regulating circuit.

An advantage of this example embodiment is that the first and second temperature regulating circuits can be controlled independently of each other.

The invention also relates to a system for controlling the temperature of a traction battery in a hybrid vehicle, where said hybrid vehicle comprises an internal combustion engine and an electric motor for traction power, said system comprising: a first temperature regulating circuit for the internal combustion engine, a second temperature regulating circuit for the traction battery, a heater, a pump and a radiator provided in said second temperature regulating circuit, said heater is provided with power via a DC/DC converter from the electrical motor, which electrical motor is driven by said internal combustion engine.

An advantage with this example embodiment is that the power for heating the battery is provided from the internal combustion engine via a DC/DC converter and said electrical motor.

In another example embodiment of the present invention said system further comprising a bypass circuit for said radiator in said second temperature regulating circuit, a valve for regulating a flow of liquid coolant into the radiator or into the bypass circuit.

An advantage with this example embodiment is that the time for reaching a working temperature of the battery may be decreased.

In yet another example embodiment according to the present invention said system further comprising a controller for controlling said electric motor by a voltage target value for feeding power to the heater when said battery is below said predetermined temperature interval.

An advantage with this embodiment is that the electrical components life time may be increased and its performance may be secured.

In still another example embodiment of the present invention said first and second temperature regulating circuits are isolated from each other.

An advantage of this example embodiment is that the first end second temperature regulating circuits can be controlled independently of each other.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

Figure 1:
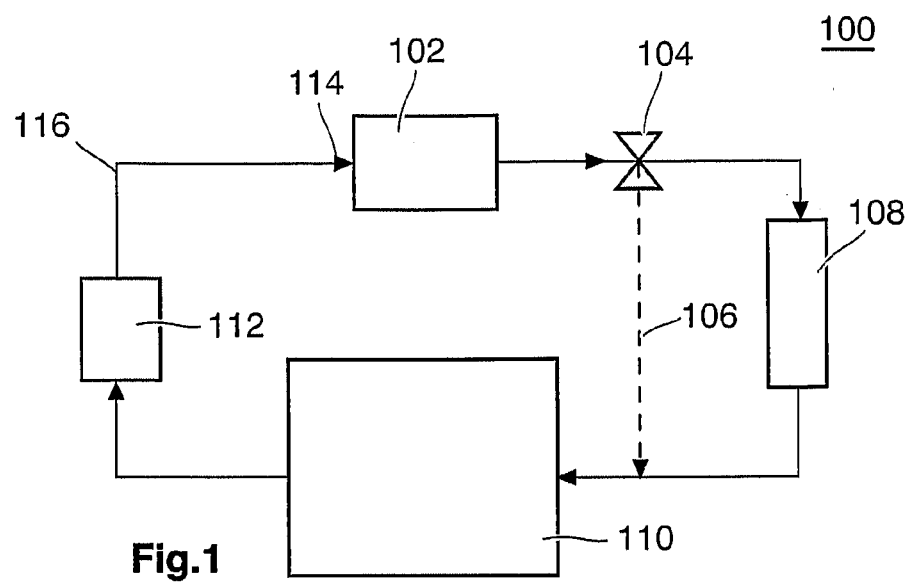
FIG. 1 depicts a schematic representation of an example embodiment of a temperature regulating circuit for regulating a temperature of a traction battery in a hybrid vehicle according to the present invention

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

FIG. 1 depicts an example embodiment of a temperature regulating circuit 100 for regulating a temperature of a traction battery in a hybrid vehicle according to the present invention. Said temperature regulating circuit 100 comprises a heater 102, an optional valve 104, an optional by pass liquid coolant circuit 106, a radiator 108, a traction battery 110, a pump 112 and a main liquid coolant circuit 116.

In the main liquid cooling circuit 116 (solid lines in FIG. 1) a liquid coolant is transportable with the help of the pump 112. The liquid coolant may be water blended with ethylene glycol, ammonia, dichlorodifluoroethane, or any other suitable liquid coolant. The pump 112 may be electrically driven and/or driven by a belt or hydraulically from an internal combustion engine. Liquid coolant is transported by the pump 112 to the heater 102. Said heater is an electric heater which uses the same line voltage as the other electric, equipment in the vehicle, which line voltage is usually 24 V for trucks, busses and construction equipment and 12V for passenger cars.

Liquid coolant is transported from the heater 102 to the radiator or a heat exchanger 108. Said heat exchanger 108 may be equipped with a fan for transporting away heat from the heat exchanger 108. Alternatively no fan is used which means that only wind speed or the environmental temperature difference is used to cool off the heat exchanger 108.

Liquid coolant is transported from the heat exchanger 108 to the traction battery 110 and then back to the pump 112. The traction battery 110 may have a line voltage of 400V, 600V or any other suitable line voltage. Said traction battery may be of the lead acid type, lithium-ion type, nickel metal hydride type or any other suitable battery type.

In FIG. 1 it is also illustrated an optional by pass liquid coolant circuit 106 (dashed line) together with a valve 104. The valve may be used to bypass the heat exchanger 108. The heat exchanger 108 may be bypassed when heating the traction battery 110 to a suitable temperature, which will speed up the time required for the battery to reach said suitable temperature compared to when the liquid coolant is forced to pass through the beat exchanger 108.

Figure 2:
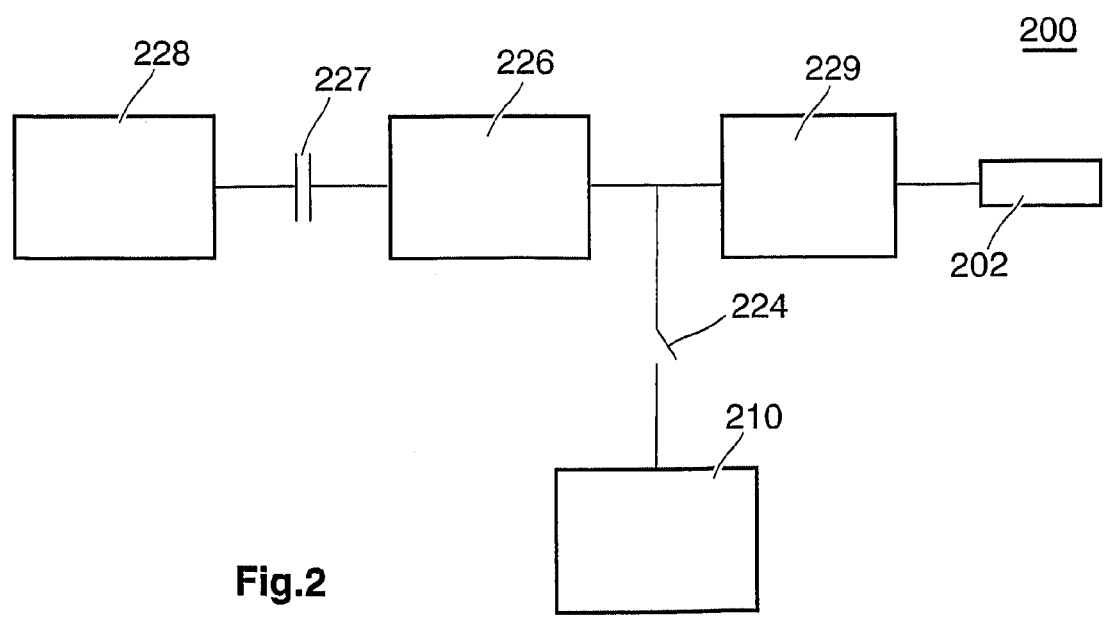
FIG. 2 depicts a schematic representation of a parallel hybrid vehicle according to an example embodiment according to the present invention.

In FIG. 2 it is illustrated a schematic representation of a parallel hybrid vehicle 200 according to an example embodiment according to the present invention. Said parallel hybrid vehicle comprises an internal combustion engine 228, a transmission 227, an electric machine 226, a DC/DC converter 229, the traction battery 210, a switch 224 and said heater 202.

The internal combustion engine 228 may be a diesel engine, a gasoline engine or a multi fuel engine. The transmission 227 comprises mechanical connection between the internal combustion engine 228 and the electric machine 226. Said transmission may inter alia comprise a clutch, a gear box, drive shaft etc. The electric machine 226 has a dual functionality, providing torque or power to the transmission for propelling the vehicle, i.e., as a motor, or in the reverse direction during regeneration, for instance when the vehicle is braking, converting mechanical energy from the wheels into electrical energy, i.e., as a generator. The regeneration may also be performed in combination with the internal combustion engine for delivering charging current to the battery.

The electric machine may be of AC type or DC type of known alternative configurations which is well known in the art and therefore need no further explanation in this context.

The DC/DC converter is used to transform the voltage generated from the battery and/or the electric machine, which is usually in the range of several hundreds of volts, to a suitable line voltage for all the electrical equipment in the vehicle which is usually in the range of 6-50 volts. The DC/DC converter is arranged between the electrical machine/traction battery and the electrical system in the vehicle comprising for instance the heater 202, radio, internal combustion engine management system, bulbs, electronics etc.

The traction battery is arranged in the hybrid vehicle 200 via a switch 224. Said switch may be used for different purposes. Firstly it may be a security switch for disconnecting the high voltage provided from the battery to the hybrid vehicle and secondly it may be used when in the charging management strategy for said battery.

A first temperature regulating circuit may be used for the internal combustion engine. The temperature regulating circuit 100 may be a second temperature regulating circuit that may be used for the traction battery. The traction battery may be heated by an electrical heater 102 provided in said second temperature regulating circuit 100 in series with a pump 112, a heat exchanger 108 and said traction battery 110. Power may be transferred to said heater via a DC/DC converter 229 from the electric machine 226, which electric machine 226 may be driven by said internal combustion engine 228, while said battery 210 (corresponding to 110 in circuit 100 in FIG. 1) is below a predetermined temperature interval.

During the heating of the battery 210 said battery 210 may be disconnected by opening the switch 224. The electric machine 225 may generate a high electric voltage in the range of 300-800V. The DC//DC converter may convert said high electric voltage to an electric voltage in the range of 6-50V. When the battery is cold the valve 104 may be set so that liquid coolant is bypassed the heat exchanger 108.

This may increase the efficiency and reduce the warm up period for the battery 110, 210. When the battery is warm enough, i.e., within a temperature range that is specific for the type of battery used, said switch 224 is closed so that the battery is connected for giving traction power to the vehicle. By ensuring that the battery is having a temperature within said temperature interval, the battery may be used without violating the life time of the battery. When the switch is closed and the battery is used for traction power its temperature may still be regulated by the second temperature regulating circuit for ensuring as long as possible life time of the battery, i.e., the heater 102, 202 may be active while the battery is providing traction power to the electric machine. While the battery is heated (and disconnected) said electric machine is voltage controlled, i.e., a voltage range is predetermined for ensuring that sufficient and not too much voltage is delivered to the electrical components while the battery is disconnected. The electric machine is working as a regulator, braking or not braking, for keeping the system voltage within said predetermined voltage range. When the battery is connected one is instead regulating the current in and out from the battery in a manner well known in the art.

The battery is only used. i.e., providing traction power to the vehicle via the electric machine, when the temperature of the battery is within a given temperature interval, which is specific for the type of battery used. Said temperature interval for the battery can be found in the technical date for the battery type used.

The above disclosed invention is described with a parallel hybrid vehicle. With appropriate amendment o the setup the present invention is equally applicable for a serial hybrid vehicle.

It is to be understood that the present invention is not limited to the embodiments described above and illustrated in the drawings; rather, the skilled person will recognize that many changes and modifications may be made within the scope of the appended claims.

The invention claimed is:

1. A method for controlling the temperature of a traction battery in a hybrid vehicle, where the hybrid vehicle comprises an internal combustion engine and an electric motor for traction power, comprising:

providing a first temperature regulating circuit for the internal combustion engine, providing a second temperature regulating circuit for the traction battery, heating the traction battery by an electrical heater provided in the second temperature regulating circuit in series with a pump, a radiator and the traction battery, and transferring power to the electrical heater via a DC/DC converter from the electrical motor, which electrical motor is driven by the internal combustion engine, while the battery is below a predetermined temperature interval.

2. The method according to claim 1, further using the battery for traction power only when the battery has a temperature within the predetermined temperature interval.

3. The method according to claim 1, further comprising providing a bypass circuit for the radiator in the second temperature regulating circuit, and regulating a flow of liquid coolant into the radiator or into the bypass circuit by a valve.

4. The method according, to claim 1, further comprising controlling the electric motor by a voltage target value for feeding power to the electrical heater when the batter is below the predetermined temperature interval.

5. The method according to claim 1, further comprising isolating the second temperature regulating circuit from the first temperature regulating circuit.

6. A system for controlling the temperature of a traction battery in a hybrid vehicle, where the hybrid vehicle comprises an internal combustion engine and an electric motor for traction power, the system comprising:

a first temperature regulating circuit for the internal combustion engine, a second temperature regulating circuit for the traction battery, a heater, a pump and a radiator provided in the second temperature regulating circuit, wherein the heater is provided with power via a DC/DC converter from the electric motor, which electric motor is driven by the internal combustion engine.

7. The system according to claim 6, further comprising a bypass circuit for the radiator in the second temperature regulating, circuit, and a valve for regulating a flow of liquid coolant into the radiator or into the bypass circuit.

8. The system according, to claim 6, further comprising a controller for controlling the electric motor by a voltage target value for feeding power to the heater when the battery is below the predetermined temperature interval.

9. The system according to claim 6, wherein the first and second temperature regulating circuits are isolated from each other.

* * * * *